Nov. 16, 1943.   E. F. SCHAEFER   2,334,292
FRUIT PICKER
Filed June 20, 1942   3 Sheets-Sheet 1
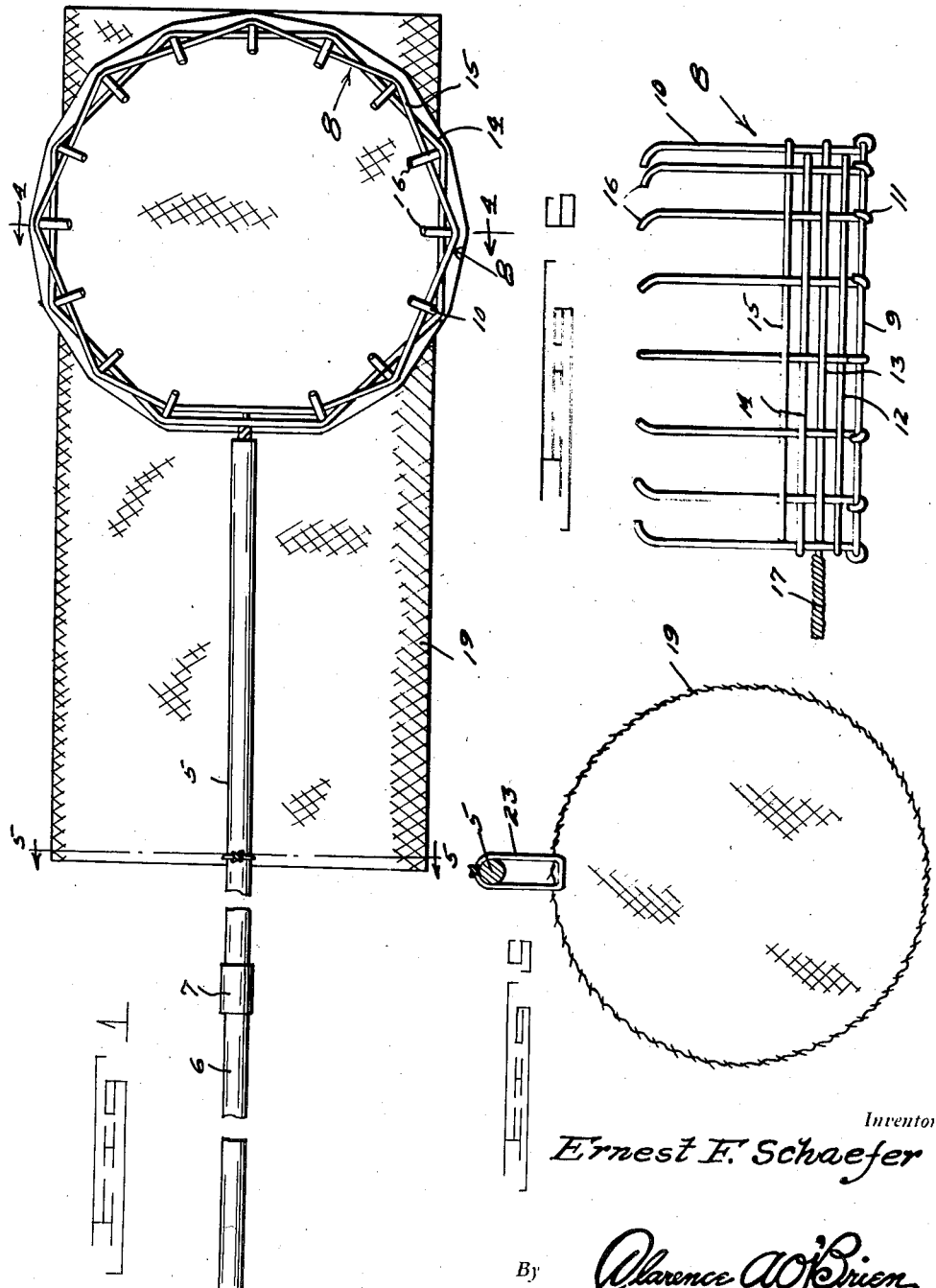
Inventor
*Ernest F. Schaefer*
By *Clarence A. O'Brien
and Harvey B. Jacobson*
Attorneys Nov. 16, 1943.  E. F. SCHAEFER  2,334,292
FRUIT PICKER
Filed June 20, 1942  3 Sheets-Sheet 2
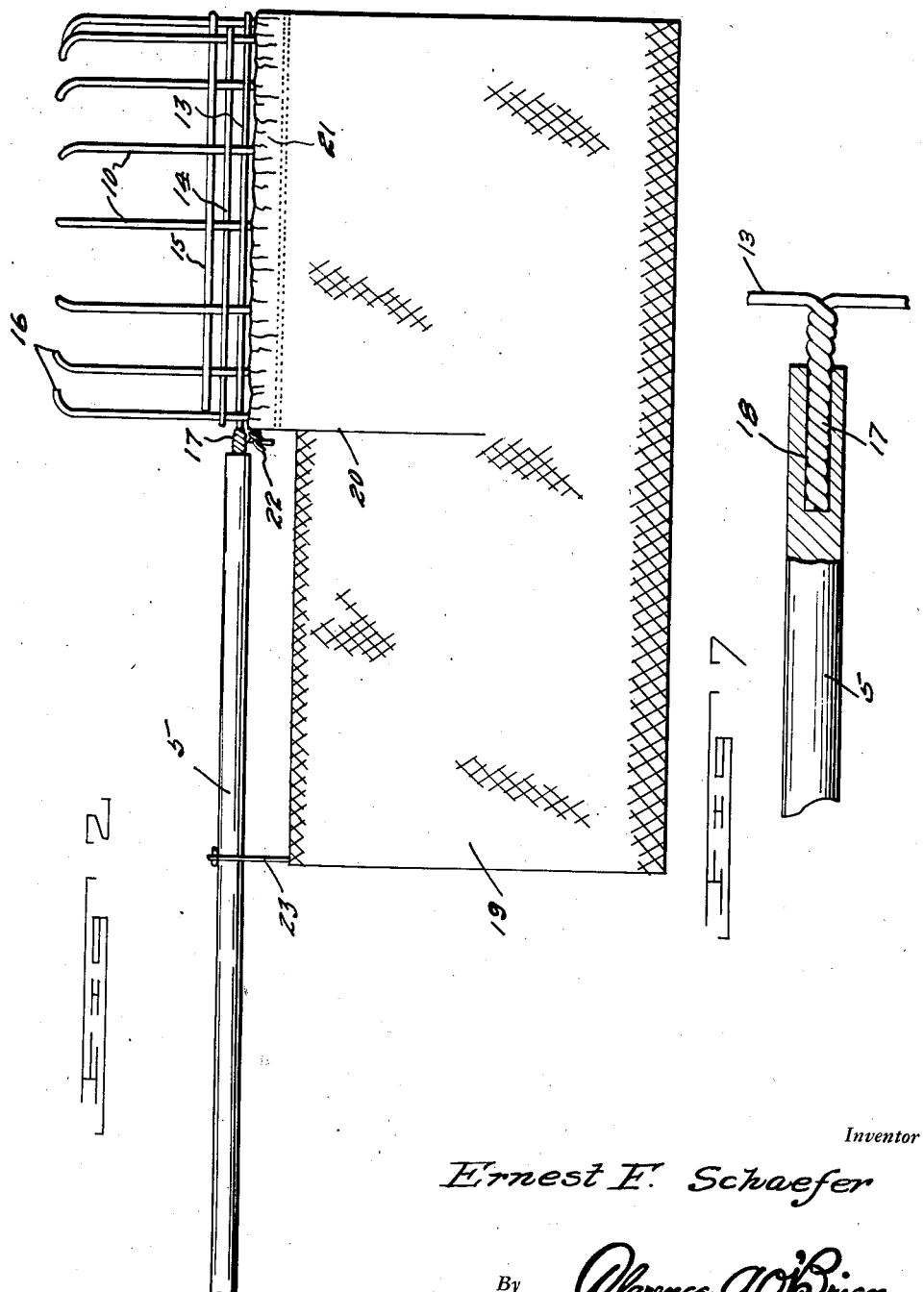
Inventor
Ernest F. Schaefer

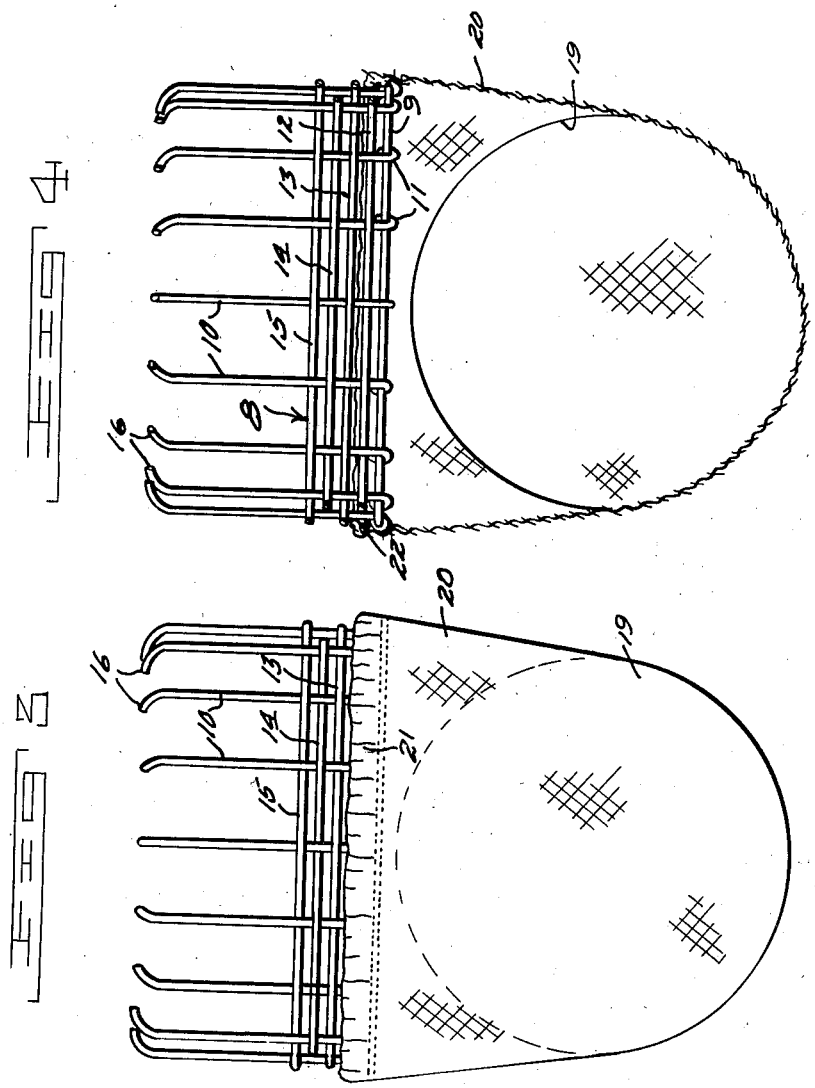

Patented Nov. 16, 1943

2,334,292

UNITED STATES PATENT OFFICE 2,334,292

FRUIT PICKER

Ernest F. Schaefer, Fort Wayne, Ind.

Application June 20, 1942, Serial No. 447,845

1 Claim. (Cl. 56—339)

This invention relates to new and useful improvements in fruit picking devices whereby plums, apples, oranges, pears and various other fruits can be picked from high limbs while the picker is on the ground.

The principal object of the present invention is to provide a picking device which does not require any hinged or pivoted part that must necessarily be operated by one hand of the picker in cutting off fruits.

Another important object of the invention is to provide a harvesting device for orchards which is extremely simple in construction permitting manufacture and maintenance at very low cost.

Other objects and advantages of the invention will become apparent to the reader of the following description.

In the drawings—

Figure 1 represents a top plan view.

Figure 2 is a side elevational view.

Figure 3 is an end elevational view.

Figure 4 is a cross sectional view on the line 4—4 of Figure 1.

Figure 5 is a cross sectional view on the line 5—5 of Figure 1.

Figure 6 is a fragmentary side elevational view of the picker head structure.

Figure 7 is a fragmentary side elevational view with a portion in section showing the means of attaching the handle.

Referring to the drawings wherein like numerals designate like parts, it can be seen that numeral 5 denotes an elongated handle which in order to supplement its length may be provided with a second handle 6 secured to one end of the handle 5 by a coupling 7. This depends upon the height of the tree from which fruit is to be picked.

The picker includes a head structure generally referred by numeral 8, this being made up of a ring 9 to which the lower ends of a plurality of picker fingers 10 are secured by clinching over the lower ends of the fingers as at 11, it being observed that the fingers 10 as well as the ring 9 are of heavy gauge wire.

Rings 12, 13, 14 and 15 are set down in conjunction with the fingers 10 in a woven manner to the end that the fingers 10 are definitely set in an annular arrangement.

The upper ends of the fingers 10 curve inwardly as at 16 so as to engage the fruit to be pulled from a tree limb, the stem of the particular piece of fruit, of course, passing upwardly between the curved ends 16 of a pair of fingers 10 when the fruit is properly engaged.

As is apparent in Figure 7, the ring 13 is split and has its end portions twisted together to provide a shank 17 which is disposed into a socket or bore 18 formed in the adjacent end of the handle 5. Thus the head structure 8 is carried by the handle 5.

Numeral 19 denotes an elongated fabric sack closed at its opposite end and having an opening in the top portion thereof adjacent one end from the edge portion of which rises a short chute 20, the upper end portion of which has a hem 21 through which a tie cord 22 is trained.

By pulling this tie cord taut to bind the hem edge of the chute 20 over the lowermost ring 9, the tie cord 22 can be knotted to the end that the chute 20 will remain attached to the head structure 8 and will not become displaced until such time as it is desired to remove the stack for the purpose of cleaning or storing separately from the head 8 and handle 5.

It can be seen that the head end of the picker is lifted up to the fruit desired to be picked by the handle 5, and the fruit is engaged between certain of the curved ends 16 of the fingers 10. A downward pull will hold the fruit loose and the fruit will fall through the chute 20 into the bag 19 without any injury to itself.

Obviously, the head structure 8 can be detached from the handle 5 and the bag 19 from both of these units for the purpose of storing the structure in a small space.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A fruit picker comprising a handle, an annular head at one end of the handle comprising a plurality of wire rings spaced apart coaxially, one of the rings being attached to and extending from said end of the handle, and rod-like picker fingers grouped around said head crosswise thereof with end portions interwoven with all of said rings and terminals thereof clinched around one of the rings, and a bag having an open end surrounding the head and detachably secured thereto.

ERNEST F. SCHAEFER.